UNITED STATES PATENT OFFICE.

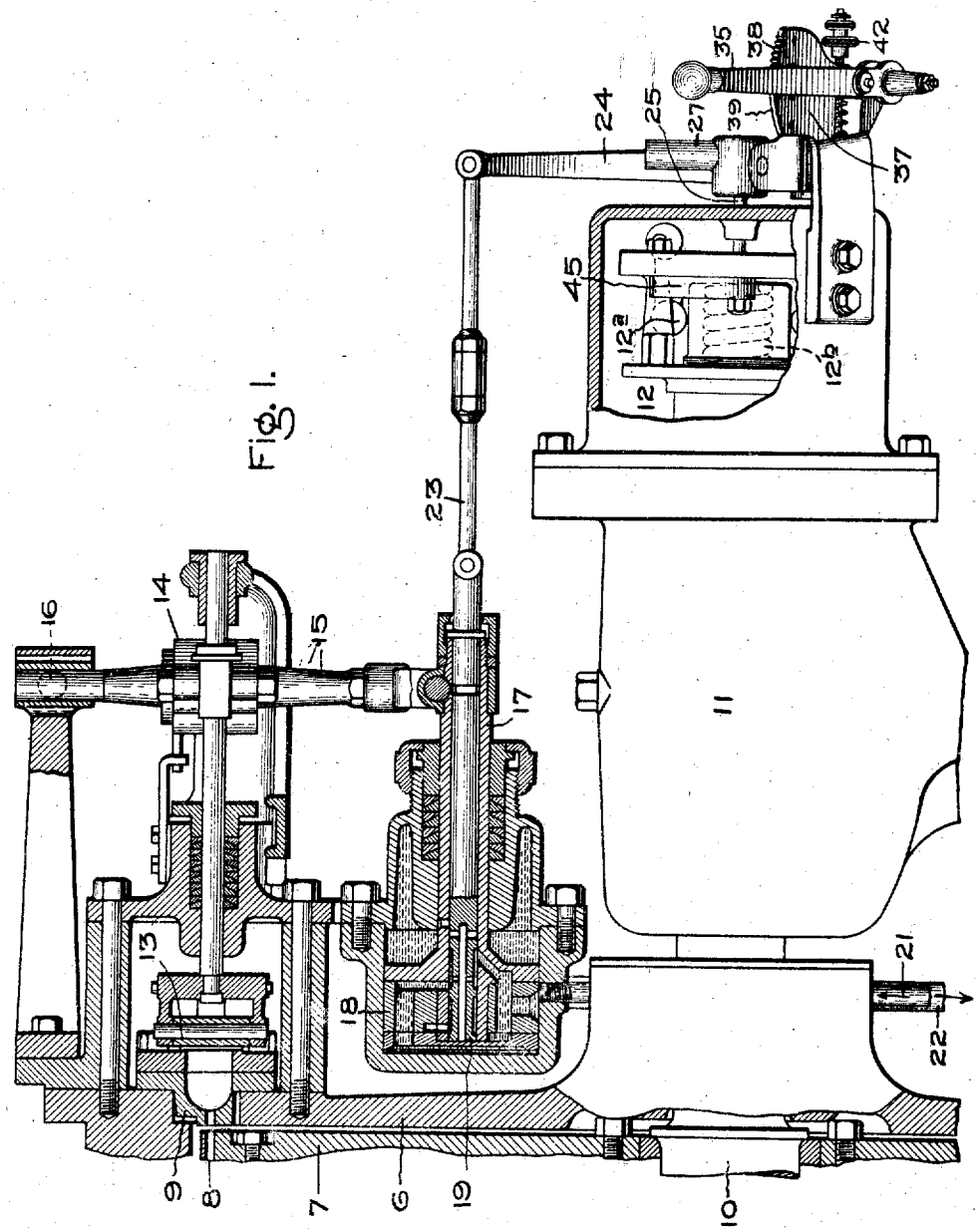

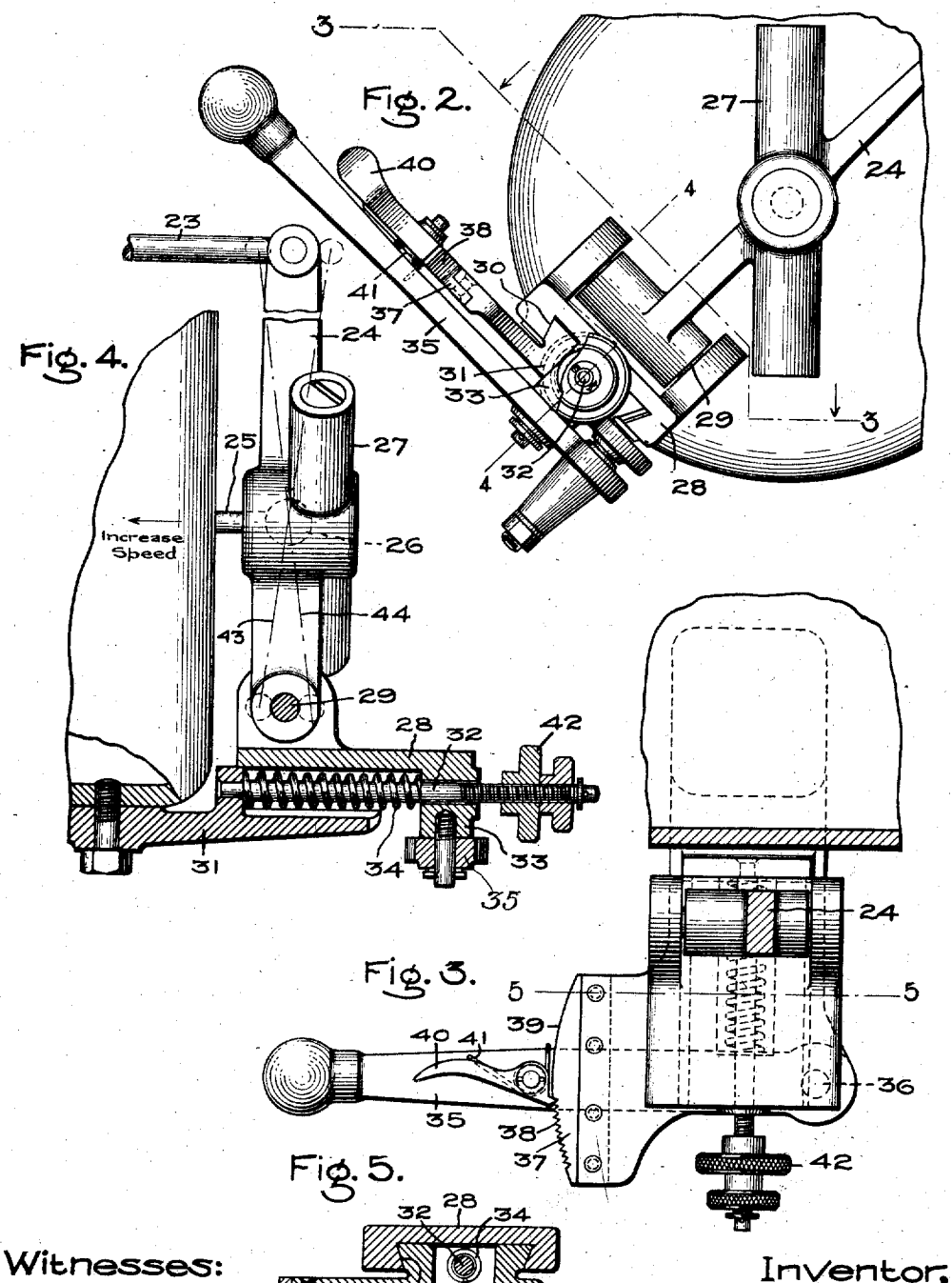

RICHARD H. RICE, OF SWAMPSCOTT, MASSACHUSETTS, ASSIGNOR TO GENERAL ELECTRIC COMPANY, A CORPORATION OF NEW YORK.

GOVERNING MECHANISM FOR TURBINES.

989,722.  Specification of Letters Patent. Patented Apr. 18, 1911.

Application filed May 13, 1909. Serial No. 495,596.

*To all whom it may concern:*

Be it known that I, RICHARD H. RICE, a citizen of the United States, residing at Swampscott, in the county of Essex, State of Massachusetts, have invented certain new and useful Improvements in Governing Mechanisms for Turbines, of which the following is a specification.

The present invention relates to governing mechanism for turbines and is intended more especially for use in connection with turbine driven pumps, but its use is not necessarily limited thereto since it can be used in connection with other turbine driven apparatus, such as air compressors, for example, where it is or may be necessary or desirable to change the speed at which the turbine shaft rotates.

In the operation of turbine driven centrifugal pumps it is desirable to easily and quickly change the speed of rotation of the pump impeller to satisfy different operating conditions. For example, when the circulating water is warm as it usually is in summer, the amount of water conveyed by the pump to the condenser should be greater than in winter when the water is cooler. Another situation would be where the pump may be required to lift the water by a greater or less amount at different times. The speed at which the turbine shaft revolves to satisfy these conditions may for convenience be said to vary from the minimum or reduced speed to the normal speed. This change is a semi-permanent one, since the conditions will remain practically constant for considerable periods of time. On the other hand for short periods of time, as in starting or priming the pump, it is desirable to operate the turbine and pump at what may be termed for convenience as an "abnormal speed" and one that is much higher than the then existing normal speed whatever that may be. It is desirable also that the turbine when operating at the so-called "abnormal speed" shall be under the control of the operator to the exclusion of the speed governor, at least until the speed becomes excessive as might be the case if the supply of water to the pump was suddenly cut off or very largely decreased. In the latter event the control of the apparatus should be taken away from the operator, as, for example, by employing an emergency governor which acts to control, actuate or release an emergency throttle valve in the main supply pipe of the turbine.

The turbine I have chosen as an illustration of my invention is designed to run at three speeds, *i. e.*; 1500, 1800 and 2700 R. P. M. When operating at 1800 R. P. M., the normal operating condition, the arrangement is such that the speed governor and valve mechanism automatically govern the turbine and keep the speed constant within the desired limits irrespective of load and pressure changes. For operating at the maximum or abnormal speed of 2700 R. P. M., the said governing mechanism is rendered non-automatic by the use of a suitable hand actuated device, and for operating at the minimum speed the governing mechanism is semi-automatic in that it prevents the speed from rising above the normal, but has no control until such speed is reached. Under the maximum and minimum conditions the speed will change with changes in load and of the steam pressure admitted to the turbine.

For a disclosure of what I believe to be novel and my invention attention is directed to the accompanying description and claims appended thereto.

In the accompanying drawings, which illustrate one of the embodiments of my invention, Figure 1 is a partial section of a turbine fitted with my improved governing mechanism; Fig. 2 is an end view of the means for adjusting the effective action of the speed governor on the valve mechanism; Fig. 3 is a sectional view taken on line 3—3 of Fig. 2; Fig. 4 is a detail view partly in side elevation and partly in section, and Fig. 5 is a sectional view of the carriage to which the governor lever is attached taken on line 5—5 of Fig. 3.

Referring to Fig. 1, 6 indicates the casing of a turbine and 7 the wheel having one, two or more rows of buckets 8 mounted thereon with the usual intermediate buckets between. Steam or other motive fluid is admitted by the nozzle or other device 9, which may comprise a single orifice or a plurality of orifices or passages. The wheel is mounted on the shaft 10 supported in suitable bearings 11 of which one is shown. On the end of the shaft is a speed governor 12 of any approved construction having the usual weights 12¹ and opposing spring 12ᵇ. The valve mechanism illustrated is that of the patent to John G. Callan, 845,448, dated Feb. 26, 1907, but while I have successfully used my invention in connection with said mechanism, it is not necessarily limited thereto, since it is of wider application.

13 indicates a nozzle controlling or regulating valve which is actuated by the valve stem yoke 14 and lever 15. The lever is pivoted at 16 at one end and is attached to the tubular piston rod 17 at the other. On the rod is a piston 18, which by its motions to-and-fro actuates the lever 15 and yoke 14 and through them the valve or valves 13. Located within the piston and tubular rod 17 is a pilot valve 19, which by moving back and forth over suitable ports in the piston controls the passage of high pressure fluid from one side to the other of said piston. Fluid enters the cylinder by the pipe 21 and exhausts by the pipe 22. As shown the motor is of a type through which fluid is constantly flowing, but other forms of fluid motors may be utilized. For the purposes of this case it is unnecessary to describe in detail the passage of fluid through the motor—it suffices to say that the pilot valve and its stem 23 are moved to the left to cause the motor piston to move the valve mechanism in a direction to decrease the steam admission, and to the right to increase said steam admission.

The pilot valve stem 23 is attached to and is actuated by the governor lever 24. Referring to Figs. 2 to 5 inclusive, the governor lever is attached to the movable abutment of the speed governor (the part acted upon by the weights and spring) by the rod 25 which is united with said lever by a ball-and-socket slip joint 26. This joint is supplied with lubricant from the chambered receptacle 27. The lower end of the lever is connected to the sliding carriage 28 by the pivot 29. The carriage is mounted on guide-ways 30 which are carried by the bracket 31, the latter being attached to the housing of the governor, or it may be formed integral therewith. Mounted in the bracket is a rod 32 that extends through a boss 33 on the carriage, the said boss also forming an abutment for the coiled compression spring 34 which surrounds the rod and tends at all times to push the carriage to the right. This action is opposed to a greater or less degree by the hand-operated lever 35, the degree of opposition being controlled by the position of said lever. The lever is pivoted at 36 to a part of the bracket, and said pivot is, therefore fixed in position. Mounted on the bracket or formed integral therewith is a quadrant 37 having teeth or notches 38 on one portion, while the peripheral surface of the other portion 39 is made smooth. The smooth portion has to do with the "abnormal" speed conditions and the notches or teeth 38 with normal and reduced speed conditions, as will appear later. Pivotally supported on the lever 35 is a detent or pawl 40 that is pressed into engagement with the peripheral surface of the quadrant by the spring 41. On the rod 32 carried by the bracket is a stop 42 to limit the outward travel of the carriage. In the present illustration of my invention the stop is composed of a nut and a check nut, which are adjustable on said rod.

The action of my improved governing mechanism is as follows:—The pivot 29 is shown in its normal position to give the normal speed of the turbine,—in the present case 1800 R. P. M., and the detent 40 is in the first notch in the quadrant 37. Under these conditions the speed governor 12 has full control of the regulating valve or valves through the pilot valve and the motor controlled thereby. As the load increases more steam will be admitted by the nozzle valves, and as it falls off, less steam. Variations in the pressure of the steam will also be taken care of automatically. With the hand lever in the normal position, i. e. the one illustrated, the travel of the governor is barely sufficient to control all of the admission valves—in this case four. Assuming that it is desirable for any reason, as, for example, to prime a centrifugal pump driven by the turbine, to temporarily increase the speed of said turbine, the operator takes hold of the handle lever 35 and moves it upward, the detent or pawl 40 riding on the smooth portion 39 of the quadrant. This action moves the carriage 28, Fig. 4, to the left and further compresses the spring 34. This action also moves the pivot 29 of the governor lever 24 to the left. At the instant this is done and before the turbine has had time to gain in speed the ball of the ball-and-socket joint 26 is fixed in position and acts as a pivot for the governor lever 24. If the hand lever is moved to its maximum amount the pivots of the governor lever will lie in a plane indicated by the broken and dotted line 43. This means that the rod 23 and the pilot valve 19 attached thereto will be moved and said valve will start the motor in a direction to cause it to further open the admission valve or open another valve, depending upon the operating conditions and the type of valve mechanism in use. Owing to the construction and arrangement of governor the governor rod 25 has a definite and limited length of travel, which is just sufficient to properly actuate the parts under normal operation, but is insufficient to move the pilot valve to a position where it and the motor will cause the valve mechanism to reduce the steam supply when the pivot 29 is shifted in the manner stated. In other words, the speed governor is temporarily incapacitated and the control of the speed is solely at the will of the operator. When the lever 35 is so displaced that the pawl 40 rides on the smooth part of the quadrant it is impossible for the governor to close all of the valves, and if the lever is in the extreme upper position it cannot close any of the valves. Owing to the fact that the portion 39 of the quadrant is smooth, the detent or pawl 40 cannot hold the lever 35 if released, and since the spring 34 acts in opposition to said manual movement of the lever 35, it follows that the operator must hold the lever in the abnormal position as long as abnormal speed is required, and just as soon as he releases the lever the pivot 29 will automatically move back, due to the spring 34, the pawl will engage the first tooth on the quadrant and normal conditions will be reëstablished. This is a very desirable arrangement, since it eliminates the danger of the operator setting the speed too high and leaving the machine. As a precaution against emergency speed conditions, i. e., a speed condition at which the safety of the parts is endangered, any usual form of emergency governor, such as 45, and stop valve (not shown) may be and preferably are used to stop the turbine when the speed becomes dangerous. For example, the said speed at which the emergency governor acts may be from 10 to 15% above the so-called abnormal speed. The emergency governor illustrated is of the type shown in United States Patent 809,772, of Jan. 9, 1906. It is evident that for every intermediate position of the lever 35 between the initial and final positions there will be a corresponding speed of the turbine. Assuming now that it is desired to reduce the speed of the turbine, for example, because the circulating water delivered by the pump to the condenser is cooler and hence a less quantity is required: the operator raises the pawl 40 and moves the lever 35 down an amount equal to the pitch of one or more of the teeth on the quadrant. This action moves the pivot 29 to the right, which has the effect of moving the pilot valve in a direction to cause a decrease in the supply of steam to the turbine. The limit of movement of the governor lever 24, due to hand manipulation in this direction, is indicated by the broken and dotted line 44. In the particular apparatus described this represents a speed of 1500 R. P. M. When the pawl 40 is in the notched part of the quadrant corresponding to the lower speeds, the turbine is not entirely out of the control of the governor. Assuming the pawl to be in any one of the notches, the speed of the turbine and the apparatus driven thereby will be somewhat below normal, due to the fact that the governor cannot open all the valves, although its weights are in a position tending to open them all. Now, if under these conditions the load decreases, the speed of the turbine will accelerate; but the speed cannot exceed 1800 R. P. M. (or whatever the normal speed may be), because as soon as the speed reaches this value the governor weights will act and close the remaining valves, in fact, the governor will not only close the remaining valves, but will have a portion of its travel still available. To state the matter in another way, if the operator sets the lever 35 in its low speed position the turbine is under the control of the governor to the extent that it can never accelerate beyond the normal governing speed, and consequently its emergency governor 45 will not act. Thus it will be seen that at maximum speed the governor and valve mechanism are non-automatic. At intermediate or normal speeds both are automatic, and for speeds below normal they are only semi-automatic, meaning by that that they prevent the speed from rising above the normal, but have no control so long as the speed remains below this value.

I have specified certain speeds in the course of this description, but it is to be understood that they are given as illustrations and not as limitations of my invention, because other speeds can be selected and the mechanism constructed and adjusted for said speeds without departing from my invention.

From the foregoing it will be seen that by shifting the pivot of the governor lever I can quickly and easily obtain a wide variation in speed to suit the requirements of service. Also that on returning the lever 35 to the position shown normal operating conditions are at once reëstablished. The arrangement also has this advantage that it does not require changing the tension of the spring on the governor, nor a change in its weights or in the distribution of their masses. Further, the apparatus is exceedingly simple, requires few parts, and such parts as are used are not expensive to make nor are they liable to get out of order.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. In a governing mechanism for turbines, the combination of a regulating valve, a means for actuating it, a governor, a lever actuated by the governor to control said means, a device for shifting the fulcrum of the lever when it is desired to control the speed of the turbine to the exclusion of the governor, and a means acting on the device for restoring control of the means to the governor when said device is released.

2. In a governing mechanism for turbines, the combination of a regulator, an automatic governor which normally controls the action of the regulator, a device for controlling the regulator to the exclusion of the governor for abnormal speed conditions, and a means which acts on said device in a manner to restore the control of the regulator to the governor when said device is released.

3. In a governing mechanism for turbines, the combination of a regulator, a means for operating it, a controller for the means, a speed governor, a lever transmitting motion from the governor to the controller, a hand lever for changing the position of the fulcrum of the governor lever, and means for locking the hand lever in certain of its positions only, comprising a pawl on said lever and a quadrant having a part of its periphery toothed and a part smooth.

4. In a governing mechanism for turbines, the combination of a regulator, a means for operating it, a controller for the means, a speed governor, a lever transmitting motion from the governor to the controller, a hand lever for changing the position of the fulcrum of the governor lever, a means which tends to move the hand lever in a direction to cause it to decrease the speed of the turbine, and means for locking the hand lever in certain of its positions only.

5. In a governing mechanism for turbines, the combination of a regulator means, a speed governor for normally controlling the action of said regulating means, a lever for transmitting motion from the governor to said means, a second lever for changing the position of the fulcrum of the first, a spring tending to move the second lever in one direction, and a locking device for the second lever.

6. In a governing mechanism for turbines, the combination of a regulator means, a speed governor for normally controlling the action of said regulating means, a lever actuated by the governor for controlling said means, a carriage that supports the fulcrum of governor lever, a spring for moving the carriage in one direction, and a hand lever acting in opposition to the spring for moving the carriage.

7. In a governing mechanism for turbines, the combination of a regulator means, a speed governor for normally controlling the action of said regulating means, a lever actuated by the governor for controlling said means, an adjustable pivot for the lever, a means tending to move said pivot in one direction, a pawl for holding the pivot in various positions against the action of the means, and a quadrant that coöperates with the pawl.

8. In a governing mechanism for turbines, the combination of a regulator, a speed governor for normally controlling the regulator, and a means which when set in one position controls the regulator to the exclusion of the speed governor and when set in another position prevents the governor from controlling the regulator until a certain predetermined speed is attained.

9. In a governing mechanism for turbines, the combination of a regulator, a speed governor, a device for transmitting movements of the governor to the regulator which includes a lever, and a means for moving the lever in a direction to render ineffective the action of the governor on the lever for certain speed conditions, and for moving the lever in the opposite direction to prevent the governor from controlling the regulator until a certain predetermined speed is attained.

10. In a governing mechanism for turbines, the combination of a regulating valve, a motor for operating it, a controller for the motor, a speed governor that normally moves the controller to regulate the motor, a means which when moved in one direction moves the controller to the exclusion of the governor and when moved in a different direction prevents the governor from acting on the controller until a certain predetermined speed is attained.

In witness whereof, I have hereunto set my hand this tenth day of May, 1909.

RICHARD H. RICE.

Witnesses:
JOHN A. MCMANUS, Jr.,
CHARLES A. BARNARD.